United States Patent [19]
Vogelsberg

[11] Patent Number: 4,528,810
[45] Date of Patent: Jul. 16, 1985

[54] TUBE ACCUMULATOR SZ TWISTING MACHINE

[75] Inventor: Dieter Vogelsberg, Coburg, Fed. Rep. of Germany

[73] Assignee: Siemens Aktiengesellschaft, Munich, Fed. Rep. of Germany

[21] Appl. No.: 553,132

[22] Filed: Nov. 18, 1983

[30] Foreign Application Priority Data

Nov. 25, 1982 [DE] Fed. Rep. of Germany ....... 3243915

[51] Int. Cl.³ .................... H01B 13/04; G02B 5/14; G02B 5/16
[52] U.S. Cl. ......................................... 57/294; 57/293
[58] Field of Search ............. 57/293, 294, 7, 6, 9, 57/3

[56] References Cited

U.S. PATENT DOCUMENTS

| 3,187,495 | 6/1965 | Christian, Jr. ................. | 57/293 |
| 3,572,024 | 3/1971 | Lyons .............................. | 57/293 X |
| 4,359,860 | 11/1982 | Schleese et al. ................ | 57/293 |
| 4,432,199 | 2/1984 | Dzyck et al. ................... | 57/294 |

FOREIGN PATENT DOCUMENTS

| 278129 | 1/1970 | Austria. |
| 1540432 | 1/1970 | Fed. Rep. of Germany. |
| 1640309 | 2/1971 | Fed. Rep. of Germany. |
| 2036532 | 2/1971 | Fed. Rep. of Germany. |
| 3108381 | 9/1982 | Fed. Rep. of Germany. |
| 1161879 | 8/1969 | United Kingdom. |

OTHER PUBLICATIONS

Von Norbert Rohde, "Siemens-Elektrodienst", 2/66, pp. 10 and 11, *Protodur–Kabel mit Ceander–Leiter.*

Primary Examiner—John Petrakes
Attorney, Agent, or Firm—Kenyon & Kenyon

[57] ABSTRACT

In order to eliminate tension variations in the metal wires in the operation of a tubular accumulator SZ twisting machine for the ceander shaped application of elements on a core the length $l_0$ of the cylindrical tube arranged between a stationary and an oscillating perforated disc satisfies the condition:

$$l_0 \geq 100 D^2 / b$$

where
 D = the outside diameter of the tube, and
 b = the period of the ceander-shaped twist. The new twisting machine is particularly useful for stranding twisting elements of an optical cable on a core.

5 Claims, 4 Drawing Figures

TUBE ACCUMULATOR SZ TWISTING MACHINE

BACKGROUND OF THE INVENTION

This invention relates to the field of twisting technology for electric and optical cables in general and more particularly to an arrangement for increasing the operating speed of apparatus for the ceander shaped application of metal wires or optical elements on a core.

In the manufacture of electric cables with a shield or concentric conductor built up from individual wires, i.e., a ceander shaped conductor, it has been customary for a long time to apply, for production and/or installation reasons, the metal wires to the cable core consisting of a conductor or a twisting group with a direction of lay which changes at short intervals (DE-OS 15 40 432). For manufacturing such a ceander conductor (See *Siemens-Elecktrodienst*, No. 2, 1966, pages 10 and 11), an apparatus is used which includes a perforated disc which revolves with a sinusoidal oscillation, guides the metal wires and together with a preceding guide tube for guiding the cable core and for temporarily receiving the shield wires as well as with a stationary perforated disc arranged at the start of this guide tube. This forms what is known as a tube accumulator SZ twisting machine (DE-GM 66 08 174).

The operation of such a machine causes difficulties inasmuch as the metal wires are subjected, in the region between the two perforated discs, to periodic length variations which bring about variations of the tension all the way into the twisting closer which immediately follows the oscillating perforated disc. It has been attempted to counteract the resulting limited operating speed of the machine by controlling the tension of the metal wires. For this purpose, in part rather expensive control measures have been provided at the supply reels of the wires or on the way from the supply reels to the stationary perforated disc (DE-OS 20 36 532, DE-OS 16 40 309).

Another way of eliminating tension variations is by arranging a further perforated disc which oscillates with shifted phase relative to the main oscillating perforated disc between the stationary and the oscillating perforated disc. The spacing of the perforated discs from each other may be variable here. By arranging a fourth perforated disc it is supposed to be possible to compensate for uneven motion of the wires. The hole circle diameters of the perforated discs are kept as small as possible (DE-GM 66 08 280).

Starting out from a tube accumulator SZ twisting machine for applying ceander shaped metal wires on a core formed by a conductor on twisting group of an electric cable which includes a stationary cylindrical tube, through which the core is conducted, perforated discs at the beginning and end of the tube through which the metal wires pass, the disc having a pitch diameter greater than that of the tube, the perforated disc at the beginning of the tube fixed and that at the end of the tube adapted to be oscillated with an angle of rotation about the axis of the tube of at most ±360°; and a twisting closer immediately following the oscillating disc, and in which the wires are stranded on the core by the oscillating disc, it is an object of the present invention to develop this apparatus further in such a manner that the metal wires or optical elements may be applied to a cable core free of troublesome tension variations, without using control or regulating devices.

SUMMARY OF THE INVENTION

Surprisingly, this problem can be solved without special design measures essentially by a selection of the dimensions of individual components of the tube accumulator SZ twisting machine. In accordance with the present invention, in order to attain this object, with a pitch circle diameter of the perforated discs of at most 1.5 times the outside diameter of the tube, the spacing $l_0$ between the stationary and the oscillating perforated disc meets the condition $$l_0 \geq 100(D^2/b),$$

where:
 $D$ = outside diameter of the cylindrical tube, and
 $b$ = the period of the ceander shaped twisting of the metal wires.

With such a design of the apparatus, it is assured that the velocity variations of the metal wires caused by variations of the content of the tube accumulator are negligibly small as compared to those manageable variations which are caused by the ceander shaped laying of the metal wires on the cable core. The velocity variations coming from the wave shaped geometry of the ceander conductor have a nearly sinusoidal wave-shape and, according to experience, are not critical if the wires are drawn off the supply containers without inertia such as in the presently customary withdrawal of the wires from barrels or with overhead withdrawal from reels.

The velocity variations caused by the wire length variations in the tube accumulator system, on the other hand, are subject to chance influences such as surface friction forces, differences in the braking force, inertial forces depending on the velocity, etc. They can increase discontinuously if a given looping angle on the accumulator tube is exceeded. In order to achieve high operating speeds, these velocity variations must be reduced as far as possible. In apparatus designed in accordance with the present invention, this is achieved by matching the tube diameter D, the spacing $l_0$ the perforated discs and the ceander period b.

It is assured by this matching that the metal wires on the accumulator tube have, in the longitudinal direction, a pitch angle $\alpha$ which is nearly uniform at all times.

If the perforated disc arranged at the end of the tube oscillates by more than ±180° relative to its central position, maintaining a pitch angle $\alpha$ which stays constant in the longitudinal direction of the tube may be in jeopardy since the wire sections lying on the tube at the start of the tube are prevented from carrying out an oscillatory motion due to the influence of friction force. In a further embodiment of the present invention it is then advantageous to arrange, in the section $l_0$, between the stationary perforated disc and the oscillating perforated disc, one or more further oscillating perforated discs, the speed of rotation of which is related to the speed of rotation of the oscillating perforated disc at the end of the tube as the respective distance of the further perforated disc from the stationary perforated disc to the section $l_0$.

The necessary constancy of the pitch angle for larger angles of rotation of the oscillating perforated disc can also be achieved by rigidly connecting one of the oscillating perforated discs to a tubular sleeve. For instance, an oscillating perforated disc arranged at half the length of the accumulator tube can be rigidly connected to a tubular sleeve which covers the accumulator tube in front of and behind the perforated disc always by one-quarter of the length of the accumulator tube.

In one embodiment, the apparatus according to the present invention contains only one oscillating perforated disc which is arranged at the end of the tube and is rigidly connected to a tubular sleeve extending from the end of the tube to approximately the middle of the tube. This tubular sleeve then transmits the rotary motion of the oscillating perforated disc by friction force up to the middle of the cylindrical tube. Depending on the braking forces, friction forces, etc., the length of the tubular sleeve is chosen so that a nearly constant pitch angle is obtained for the applied metal wires in the longitudinal direction. As compared to an embodiment with additional oscillating perforated discs, this embodiment has the advantage that the metal wires do not have to be threaded through additional openings.

In apparatus designed according to the present invention it is in general ensured that no wire length variations occur between the oscillating perforated discs at the end of the tube and the twisting closer. In order to assure this even in the case of large differences between the diameter of the cable core and the diameter of the cylindrical tube and therefore, in case of greater lengths between the guide holes of the oscillating perforated discs and the twisting closer, it is advisable to provide the oscillating perforated disc with an extension in the direction of the twisting closer in the form of an auxiliary perforated disc.

DETAILED DESCRIPTION OF THE INVENTION

Figure 1:
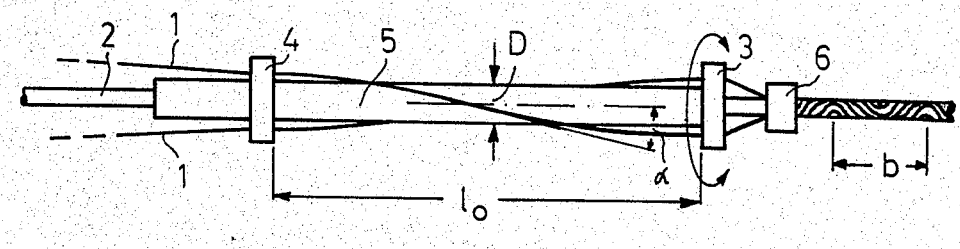
FIG. 1 is a schematic longitudinal view of a first embodiment of the present invention.

FIG. 1 shows the principle of a tube accumulator SZ twisting machine for the ceander shaped application of metal wires 1 to a cable core 2. To this end, an oscillating perforated disc 3 with an immediately following twisting closer 6 is provided. The oscillating perforated disc 3 is preceded by a stationary cylindrical guide tube 5 through which the cable core 2 runs. At the beginning of the cylindrical tube 5 there is a stationary perforated disc 4 spaced a distance $l_0$ from the oscillating perforated disc 3.

The metal wires 1 run first through the holes of the perforated disc 4 arranged on a pitch circle, where the diameter of this pitch circle is at most 1.5 times the diameter D of the cylindrical tube 5. The same condition applies to the pitch diameter of the oscillating perforated disc 3. It is assured thereby that the metal wires lie on the surface of the cylindrical tube 5 nearly over the entire region between the two perforated discs; their pitch angle is designated as $\alpha$.

The distance $l_0$ between the stationary perforated disc 4 and the oscillating perforated disc 3 is chosen as a function of a diameter D of the cylindrical tube 5 as well as a function of the period b of the ceander twist according to the condition $$l_0 = 100(D^2/b)$$

For instance, for cable cores with a diameter of 20 to 50 mm, an accumulator tube with an outside diameter $D = 75$ mm is chosen for applying a ceander shield with a period $b = 200$ to 400 mm and a looping angle of $\pm 180°$.

Figure 2:
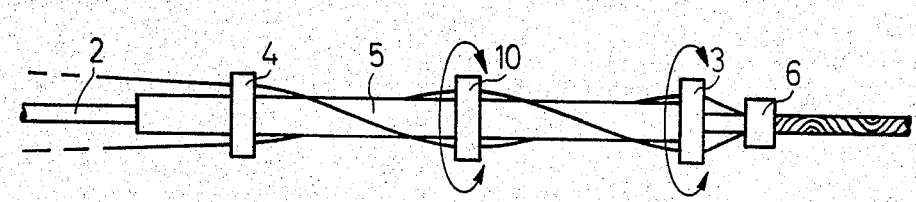
FIG. 2 is a similar view of a second embodiment with an additional perforated disc.

The distance $l_0$ between the stationary perforated disc 4 and the oscillating perforated disc 3 is set as $l_0 = 3000$ mm. In order to achieve with certainty with this large length of the tube 5, a pitch angle $\alpha$ which is approximately constant at all times over the entire length of the tube, a further perforated disc 10, the speed of rotation of which is one-half that of the oscillating perforated disc 3, can be arranged at half the length of the tube. All three perforated discs have a pitch diameter of 90 mm. An embodiment with this variant is shown in FIG. 2.

Figure 3:
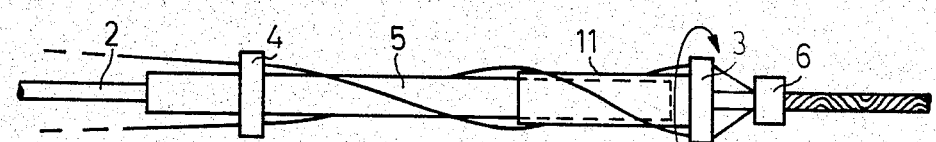
FIG. 3 is a similar view of a third embodiment with a tube extending from the oscillating disc.

In the variant according to FIG. 3, the oscillating perforated disc 3 is rigidly connected to a tubular sleeve 11 which covers the tube 5 over about ⅓rd of its length. The tubular sleeve 11, which oscillates on the tube 5 with the same speed of rotation as the perforated disc 3, can also cover the tube 5 up to ½ of its length between the perforated discs 3 and 4. By reducing the diameter of the tube 5 in the covered region, a transition from the tube 5 to a tubular sleeve 11 with the same diameter can be achieved.

Figure 4:
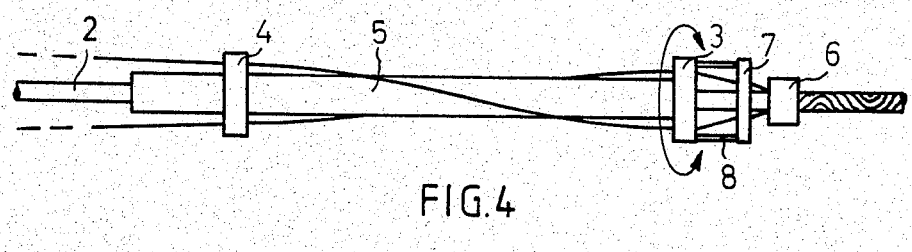
FIG. 4 is a similar view of a fourth embodiment with an extended oscillating disc.

According to FIG. 4, the oscillating perforated disc 3 is extended in the direction toward the twisting closer 6. For this purpose, an auxiliary perforated disc 7 which is connected to the perforated disc 3 via rod-shaped connecting elements 8 and therefore rotates synchronously with this perforated disc is provided. The guide holes in the auxiliary perforated disc 7 for the individual metal wires are arranged, according to the entry angle of the metal wires into the twisting closer 6 and, according to the smallest possible distance of the auxiliary perforated disc 7 from the twisting closer 6, on a substantially smaller pitch diameter than the guide holes of the perforated disc 3.

The new twisting device of the present invention can be used quite generally for the ceander shaped application of twisting elements on a core, but particularly in the manufacture of optical cables where it is important to twist the twisting elements of the optical cable (optical conductors and/or stranded auxiliary elements) in one or more layers on a core, particularly on a support member with high tensile strength. A corresponding optical cable is described, for instance, in DE-OS 31 08 381.

What is claimed is:
1. In a device for applying elements on a core in a ceander shape including:
   (a) a stationary cylindrical tube, through which the core is conducted;
   (b) a first perforated disc which is arranged at the beginning of the tube;
   (c) a second perforated disc at the end of the tube, the elements passing through said first and second discs, the pitch diameter of the said perforated discs being greater than the outside diameter of said tube, said first perforated disc being stationary and the second perforated disc adapted to oscillate about the tube with an angle of rotation of at most $\pm 360°$; and
   (d) a twisting closer arranged immediately following the oscillating perforate disc, the metal wires being stranded on the core by means of the oscillating perforated disc, the improvement comprising:

(e) with a pitch diameter of the perforated discs of at most 1.5 times the outside diameter (D) of the tube, the distance ($l_0$) between the stationary and the oscillating perforated disc fulfills the condition:

$$l_0 \geqq 100(D^2/b)$$

where D=the outside diameter of the cylindrical tube and b=the period of the ceander shaped twist of the metal wires.

2. The improvement according to claim 1, and further including at least one further oscillating perforated disc disposed on the section between said first perforate disc and said second perforated disc, the pitch diameter of said further disc being at most 1.5 times the outside diameter (D) of the tube, and the speed of rotation of said further disc bearing the same relationship to the speed of rotation of said second perforated disc as the distance of said further perforated disc from said first perforated disc bears to the length $l_0$.

3. The improvement according to claim 1, and further including a tubular sleeve which partially covers the tube rigidly connected to said second disc.

4. The improvement according to claim 1 and further including an extension in the form of an auxiliary perforated disc disposed between said second perforated disc and said twisting closer.

5. The use of the device according to one of the claims 1 to 4, for stranding twisting elements of an optical cable on a core, particularly on a support member of high tensile strength.

* * * * *